United States Patent
Chandra et al.

(10) Patent No.: US 6,889,254 B1
(45) Date of Patent: May 3, 2005

(54) SCALABLE MERGE TECHNIQUE FOR INFORMATION RETRIEVAL ACROSS A DISTRIBUTED NETWORK

(75) Inventors: Tushar Deepak Chandra, New York, NY (US); Daniel Charles Sturman, Englewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 09/281,420

(22) Filed: Mar. 30, 1999

(51) Int. Cl.[7] .................... G06F 15/173; G06F 15/16
(52) U.S. Cl. ........................... 709/224; 709/201
(58) Field of Search ................... 709/201, 208, 709/223, 224, 238; 714/2, 748, 799, 4; 707/3, 10

(56) References Cited

U.S. PATENT DOCUMENTS

| | | | | |
|---|---|---|---|---|
| 4,958,284 A | * | 9/1990 | Bishop et al. .............. 434/353 |
| 5,202,987 A | * | 4/1993 | Bayer et al. ................ 709/102 |
| 5,321,813 A | | 6/1994 | McMillen et al. .......... 370/228 |
| 5,398,012 A | | 3/1995 | Derby et al. ........... 340/825.03 |
| 5,457,808 A | * | 10/1995 | Osawa et al. .................. 455/8 |
| 5,517,562 A | | 5/1996 | McConnell ................. 379/207 |
| 5,535,322 A | | 7/1996 | Hecht ......................... 395/155 |
| 5,612,957 A | | 3/1997 | Gregerson et al. ........... 376/60 |
| 5,689,706 A | * | 11/1997 | Rao et al. ................... 707/201 |
| 5,708,772 A | * | 1/1998 | Zeldin et al. ................. 714/25 |
| 5,729,685 A | * | 3/1998 | Chatwani et al. ........... 709/224 |
| 5,729,751 A | * | 3/1998 | Schoolcraft ................. 707/530 |
| 5,751,967 A | * | 5/1998 | Raab et al. ................. 709/228 |
| 5,854,834 A | * | 12/1998 | Gottlieb et al. ......... 379/114.04 |
| 5,920,718 A | * | 7/1999 | Uczekaj et al. ............. 717/109 |
| 5,966,695 A | * | 10/1999 | Melchione et al. ........... 705/10 |
| 6,088,517 A | * | 7/2000 | Wanner et al. .............. 710/110 |
| 6,134,599 A | * | 10/2000 | Chiu et al. .................. 709/252 |
| 6,170,017 B1 | * | 1/2001 | Dias et al. .................. 709/235 |
| 6,212,511 B1 | * | 4/2001 | Fisher et al. ................... 707/1 |
| 6,216,140 B1 | * | 4/2001 | Kramer ....................... 707/511 |
| 6,298,478 B1 | * | 10/2001 | Nally et al. ................. 717/170 |

OTHER PUBLICATIONS

Lorenzo Aguilar, "Datagram Routing for Internet Multicasting," ACM Computer Communications Review, 14(2), 1984, pp. 58–63.

(Continued)

Primary Examiner—Jason D. Cardone
(74) Attorney, Agent, or Firm—Douglas W. Cameron, Esq.; Kevin P. Radigan, Esq.; Heslin Rothenberg Farley & Mesiti, P.C.

(57) ABSTRACT

A scalable merge technique for information retrieval across a distributed network is provided, as well as a fault tolerant technique for communicating information across the distributed network. The merge technique includes multicasting a query request across a spanning tree of the distributed network from a root node to multiple clients of the tree, and receiving back at the root node, a merged response produced from responses from at least some of the clients of the spanning tree. The fault tolerant technique for communicating information across the distributed network includes assigning a unique identifier to each query request, automatically reconfiguring the network upon detection of a failure of a node of the network, and retransmitting the query request and/or any responses thereto within the reconfigured network.

21 Claims, 7 Drawing Sheets

OTHER PUBLICATIONS

D. Scott Alexander et al., "The Switch Ware Active Network Architecture," IEE Network Special Issue on Active and Controllable Networks, May/Jun. 1998, vol. 12, No. 3, pp. 29–36.

Uyless Black, TCP/IP & Related Protocols, Second Edition. McGraw–Hill, 1995, pp. 122–126.

Antonio Carzaniga, "Architectures for an Event Notification Service Scalabel to Wide–area Networks", Available from http://www.cs.colorado.edu/users/carzaniga/siena/index.html.

Stephen E. Deering, "Multicast Routing in InterNetworks and Extended LANs," ACM Computer Communications Review, 18(4), 1988, pp. 55–64.

John Gough and Glenn Smith, "Efficient Recognition of Events in a Distributed System," Proceedings of ACSC–18, Adelaide, Australia, 1995.

Bill Segall and David Arnold, "Elvin has left the building: A publish/subscribe notification service with quenching," Proceedings of AUUG97, Brisbane, Australia, Sep. 1997. Available from http://www.dstc.edu.au/Elvin/papers/AUUG97//AUGG97.html.

R. Sharma, S. Keshav, M. Wu and L. Wu. "Environments for Active Networks," Proceedings of the IEEE 7th International Workshop on Network and Operating System Support for Digital Audio and Visual, 1997, pp. 77–84.

Tony Speakman, Dino Farinacci, Steven Lin and Alex Tweedly. "PGM Reliable Transport Protocol," IETF Internet Draft, Aug. 24, 1998.

D. Tennenhouse, J. Smith, W.D. Sincoskie, D. Wetherall, G. Minden. "A Survey of Active Network Research," IEEE Communications Magazine. Jan., 1997, vol. 35, No. 1, pp. 80–86.

* cited by examiner

SCALABLE MERGE TECHNIQUE FOR INFORMATION RETRIEVAL ACROSS A DISTRIBUTED NETWORK

TECHNICAL FIELD

This invention relates in general to information retrieval across a distributed network environment, and more particularly, to an efficient technique for gathering responses in a distributed network environment, as well as to a technique for automatically recovering from failure at a node of the distributed network environment.

BACKGROUND OF THE INVENTION

Internet and intranet information dispersal mechanisms (e.g., a multicast protocol) for event systems, such as a publish/subscribe system, and for push information distribution have recently received much attention. However, little work has been done on the inverse problem; i.e., collecting responses to a common question from a large number of distributed computing clients.

In a wide-area network, such as the internet or a corporate intranet, networks tend to be organized as a set of routers connected by links resulting in a graph where at least one path exists from any client of the network to any other client in the network. Routers receive messages along links and resend the messages along other links, as determined by the nature of each message, i.e., usually a destination network address stored in the message. The users of the network, that is, those entities such as computers, people, telecommunication devices, etc., who are using the network for communication between themselves, are all connected through at least one link to at least one router. For purposes of the description provided herein, however, both users and routers can be thought of as nodes, with users being distinguished as providing function other than only networking and routing.

A popular mechanism for multicasting a message in such a network is to distribute a message along a spanning tree of the network graph. That is, from the sending client, a set of links is chosen so that when the message follows these links from node to node, each router is visited exactly once and thus the message is delivered efficiently to each client. A different spanning tree may result for each sending client since the sending client determines the root of the multicast tree. In addition, the spanning tree may vary even for a single sending client. Most wide-area networks have multiple paths between clients allowing a choice as to which path is the best one to incorporate into a multicast spanning tree.

DISCLOSURE OF THE INVENTION

Recognized herein is a growing need for systems which can gather responses from a group of clients in an application-specific manner and can efficiently provide reliable gather operations for groups distributed through, for example, the internet or a corporation intranet. An efficient mechanism is one that minimizes network load. For example, a solution where all clients independently send a response to the querying server is not considered efficient because, for a group with a large number of clients and where queries are common, the load on the network and in the servers would be excessive. Further, whichever mechanism is used to choose a spanning tree for multicast messaging, the gather operation preferably has the capability to utilize the same spanning tree or another equally valid spanning tree. The information retrieval technique and recover mechanism described herein are directed to meeting these needs/goals.

Briefly summarized, in one aspect a method for retrieving information in a distributed network environment is provided. This method includes: distributing a query request across the distributed network environment from a root node to multiple clients of the network environment; and receiving at the root node, back across the distributed network environment, a merged response produced from responses from at least some clients of the multiple clients.

In another aspect, a method for gathering responses in a distributed network environment having a plurality of nodes is provided. The method comprises at a given node of the plurality of nodes: gathering responses from multiple clients or child nodes of the given node; and merging gathered responses at the given node for forwarding of a merged response to a parent node of the node.

In still another aspect, a fault tolerant method for communicating information across a distributed network is provided. This fault tolerant method includes: detecting a failure at a node of the distributed network; responsive to the detecting of a failure, reconfiguring the distributed network to eliminate the node with the failure, and notifying each node of the network whose children node(s) or parent node(s) have changed; and at that a parent node having changed children nodes, retransmitting the query request to the changed children nodes; and at each child node with a new parent node, delivering the response to the query request to the new parent node.

In a further aspect, a request structure is provided from communicating a query across a distributed network environment. This request structure includes a query description comprising the query itself, and a merge function for use by the distributed network in merging responses to the query for return back to a root node originating the query.

In a further aspect, a system is provided for retrieving information in a distributing network environment. This system includes means for distributing a query request across a distributed environment from a root node to multiple clients of the network environment. This system further includes means for receiving back at the root node from across the distributed network environment, a merged response produced from responses of at least some clients of the multiple clients of the distributed network environment.

In a still further aspect, a system for gathering responses in a distributed network environment having a plurality of nodes is provided. This system includes means for gathering responses from at least one client or child node of a given node of the distributed network environment; and means for merging gathered responses at the given node for forwarding of a merged response to a parent node of the given node.

In a further aspect, a fault tolerant system is provided for communicating information across a distributed network. The system includes means for detecting a failure at a node of the distributed network, and means (responsive to the detecting of a failure) for reconfiguring the distributed network to eliminate the node with the failure, and for notifying each node of the reconfiguration if the node has at least one changed child node or parent node. The system further includes means for automatically retransmitting the query request from a parent node having at least one changed child node to the at least one changed child node and means for delivering a response to the query request to each new parent node from a child node having the new parent node.

Articles of manufacture comprising computer program products with computer useable medium having computer readable program code means therein for implementing the above-summarized methods and systems are also provided herein.

To restate, provided herein is an information retrieval technique which includes querying a group of clients and gathering responses through a query specific merge mechanism. Queries can take many forms including free-form questions, multiple choice questionnaires, or responses from application-specific sensors, and in general, queries and the merge mechanism may be customized for individual applications. The invention efficiently implements query-and-gather for a large group of clients distributed over a network, such as a wide area network. Furthermore, the invention can query-and-gather in a group even in the face of a failure, e.g., a node failure or a network error at a node. In addition, the gather protocol (i.e., the protocol used to collect responses) may be optimized in response to the characteristics of the query. For example, an opinion poll may only require a sample of the total responses and therefore it may be complete before all responses are received. Other optimizations are also disclosed herein.

BRIEF DESCRIPTION OF THE DRAWINGS

The subject matter which is regarded as the present invention is particularly pointed out and distinctly claimed in the claims at the conclusion of the specification. The foregoing and other objects, features and advantages of the invention will be apparent from the following detailed description taken in conjunction with the accompanying drawing figures in which:

FIG. 4b is an example of the query request structure of FIG. 4a;

BEST MODE FOR CARRYING OUT THE INVENTION

Generally stated, presented herein is a scalable merge technique for efficiently retrieving information from clients coupled to a distributed network comprising multiple nodes and clients. More particularly, a gather technique is disclosed for gathering responses in an application-specific manner from a group of clients and producing a merged response for return across the distributed network to a sender originating a query request. In another aspect, a mechanism is provided for efficient gathering of responses from a large number of clients (i.e., group members) distributed over a wide area network notwithstanding failure at a node of the network. As used herein, "failure" refers to an inability of a parent node to communicate with a child node, e.g., as a result of a child node's failure or other type of network error between the nodes. It is assumed that the network provides basic point-to-point reliable messaging capabilities, but no additional support is assumed. The gather mechanism is based on a spanning tree interconnecting the clients, where some nodes on the tree are clients being polled. The gather technique being presented herein leverages existing multicast techniques to construct a tree containing the nodes being queried for information. Only nodes in the tree participate in the gather operation. Thus, gather operations may be implemented efficiently without undue resource cost.

Figure 1:
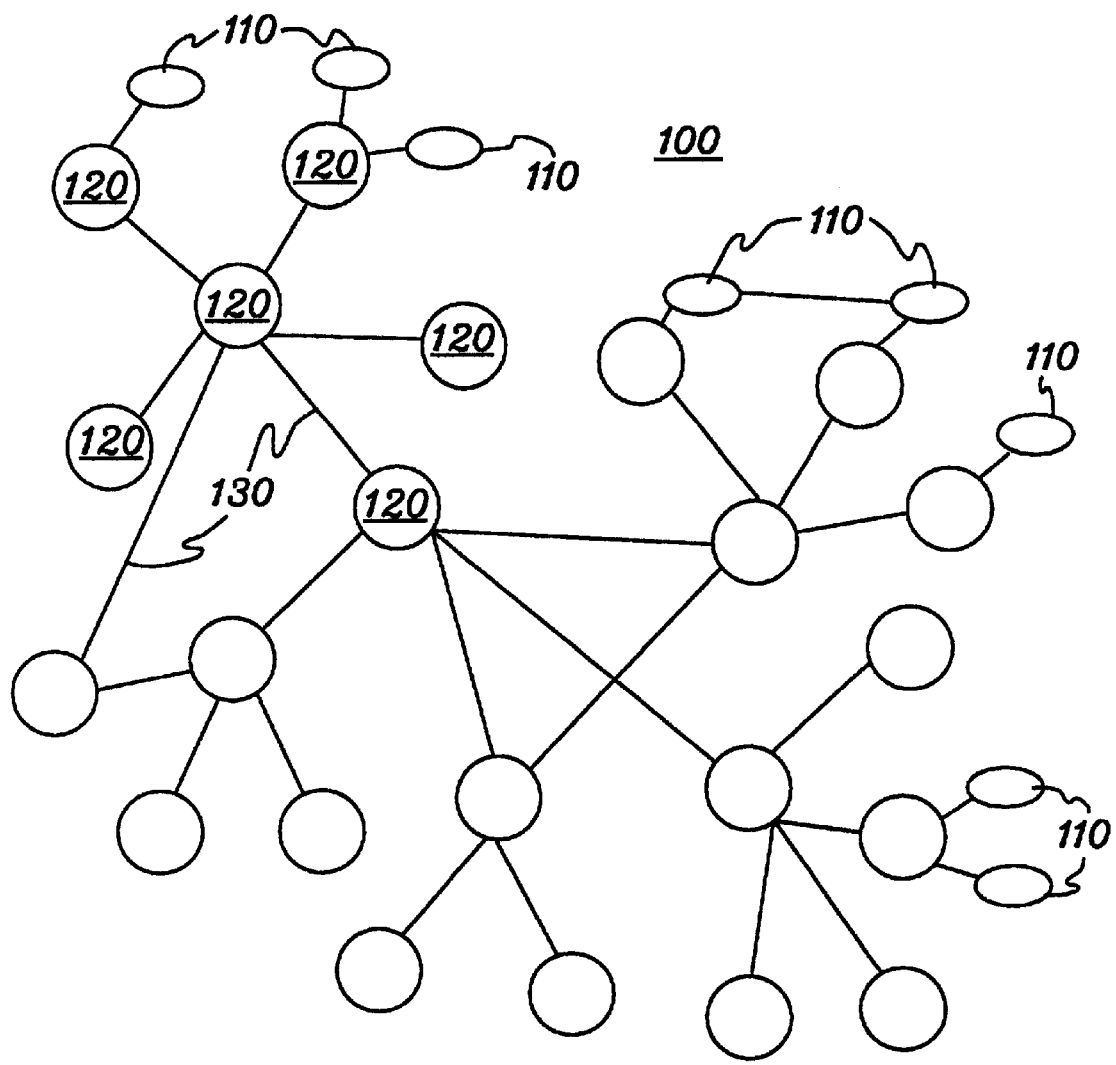
FIG. 1 is an illustration of a distributed network environment wherein clients are interconnected by nodes.

FIG. 1 depicts an example of a distributed network environment, generally denoted 100, having multiple clients 110 connected to nodes 120 of the network. In this network graph 100 nodes 120 are coupled together by links 130. In practice, a node 120 and client 110 coupled thereto could comprise a single computer system in one example. Further, a node 120 could also comprise a conventional router in a wide area network.

Figure 2:
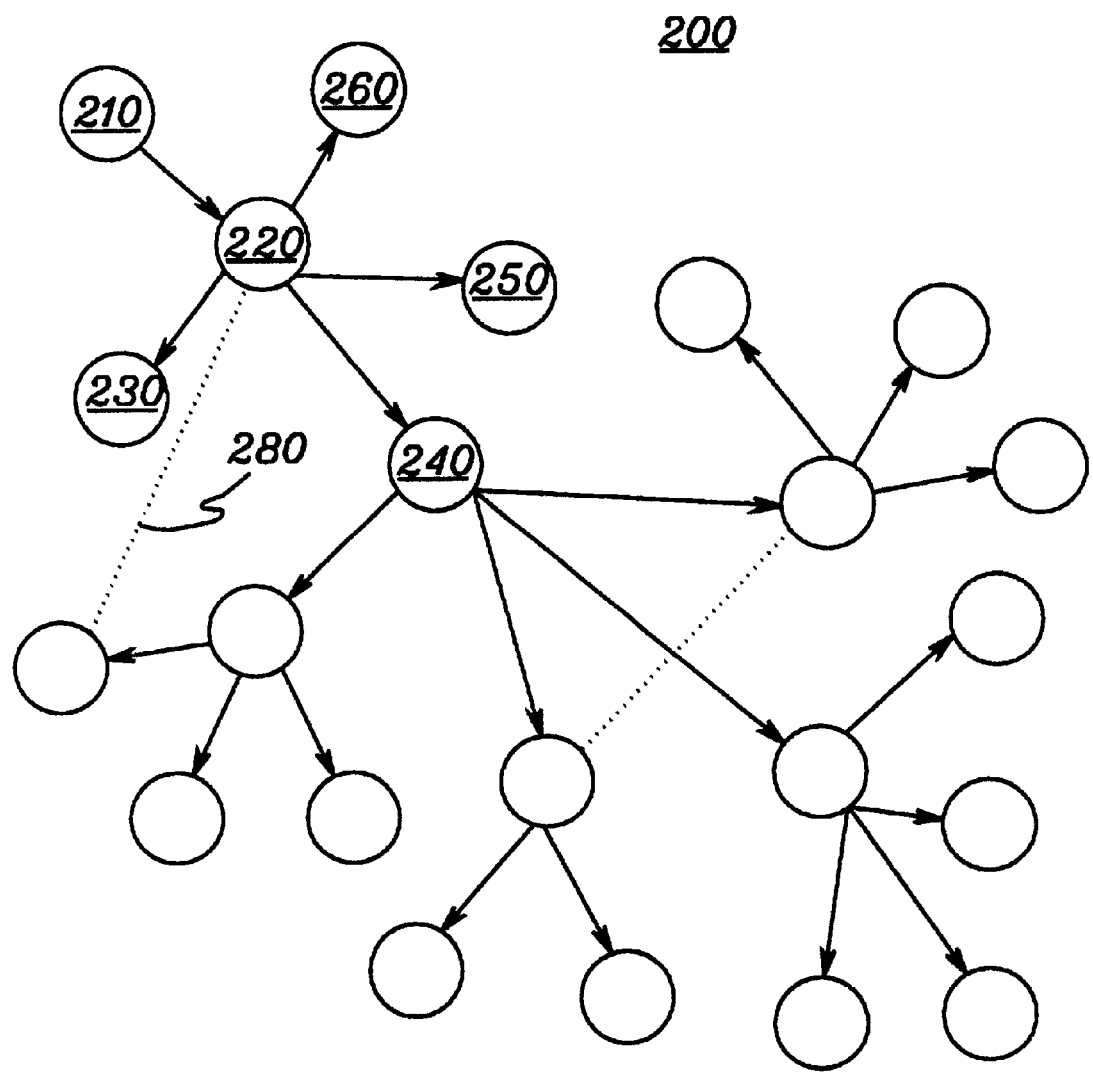
FIG. 2 is an illustration of a spanning tree employing the network graph of FIG. 1.

FIG. 2 depicts an example of a spanning tree 200 constructed from the distributed network of FIG. 1. Spanning tree 200 is used to distribute a message from a root node 210 to each other node of the network. Links 280 comprise unused network links for spanning tree 200. In this example, nodes 230 and 240, 250 & 260 are children nodes of node 220, and root node 210 comprises a parent node to node 220. Root node 210 may be coupled to a client 110 (FIG. 1) which originates a query request to be multicast across the spanning tree to other clients of the network for retrieval of information therefrom. Starting at the root, as each node receives the query request, it delivers the request to its children nodes in the tree, if any. The children nodes, in turn, pass the query request down the tree so that the message is delivered to all nodes. As explained further below, a query request preferably has a structure which includes a description of the query, a description of the response type and a description of a customizable merge function to be used in combining several responses.

In accordance with the principles of the present invention, after receiving the query request, each client or leaf node replies to its parent node. Each interior node in the tree collects responses and uses an application specific merge function, e.g., supplied with the request, to merge its response with the responses of its children nodes. This interior node then passes the merged response to its parent node. The process repeats until, finally, when the root node merges its result with the results of its children nodes, a single distilled or concatenated response is obtained and passed to the server requesting the query.

Figure 3:
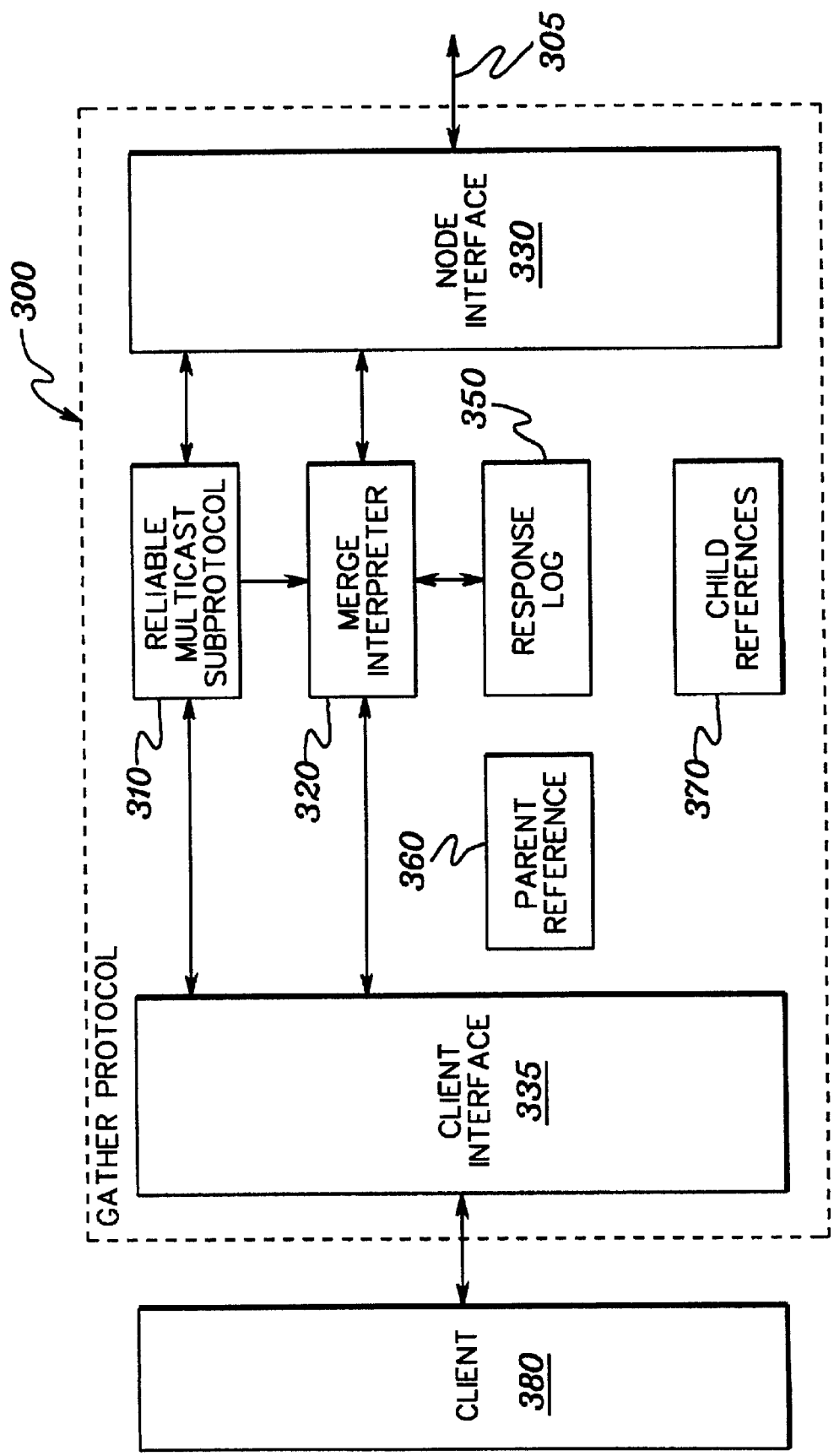
FIG. 3 depicts an implementation of gather protocol at a node of the spanning tree of FIG. 2 in accordance with the principles of the present invention.

FIG. 3 depicts one embodiment of gather protocol 300 in accordance with the principles of the present invention implemented at, for example, each node of a spanning tree across which a request query is communicated. As shown, each node having this gather protocol holds a reference to its parent node(s) 360 and its child node(s) 370 in the spanning tree. In one embodiment, a query request is transmitted to all nodes using the reliable multicast subprotocol 310. When the query request is received, it is sent in one embodiment to a merge interpreter 320 for extracting information on the response type and merge function to be employed.

Reliable multicast protocol 310 initiates gather operations by delivering query requests to each node of the spanning tree. Starting at the root node, as each node receives the request, that node delivers the request to its children nodes in the tree, if any. The children, in turn, pass the query request down the tree so that the message is delivered to all nodes or group members of the tree. One skilled in the art will realize that there are multiple multicast protocols upon which the gather mechanism may be built. By way of example, reference the multicast protocols described in: K. P. Birman, "The Process Group Approach to Reliable Distributed Computer," pages 36–53, Communications of the ACM, Vol. 36, No. 12, December 1993; Ulysses Black, *TCP/IP & Related Protocols*, Second Edition. McGraw-Hill, 1995, pp. 122–126; Lorenzo Aguilar, "Datagram Routing for Internet Multicasting," ACM Computer Communications Review, 14(2), 1984, pp. 48–63; and Tony Speakman, Dino Farinacci, Steven Lin, and Alex Tweedly, "PGM Reliable Transport Protocol," IETF Internet Draft, Aug. 24, 1998.

Figure 4A:
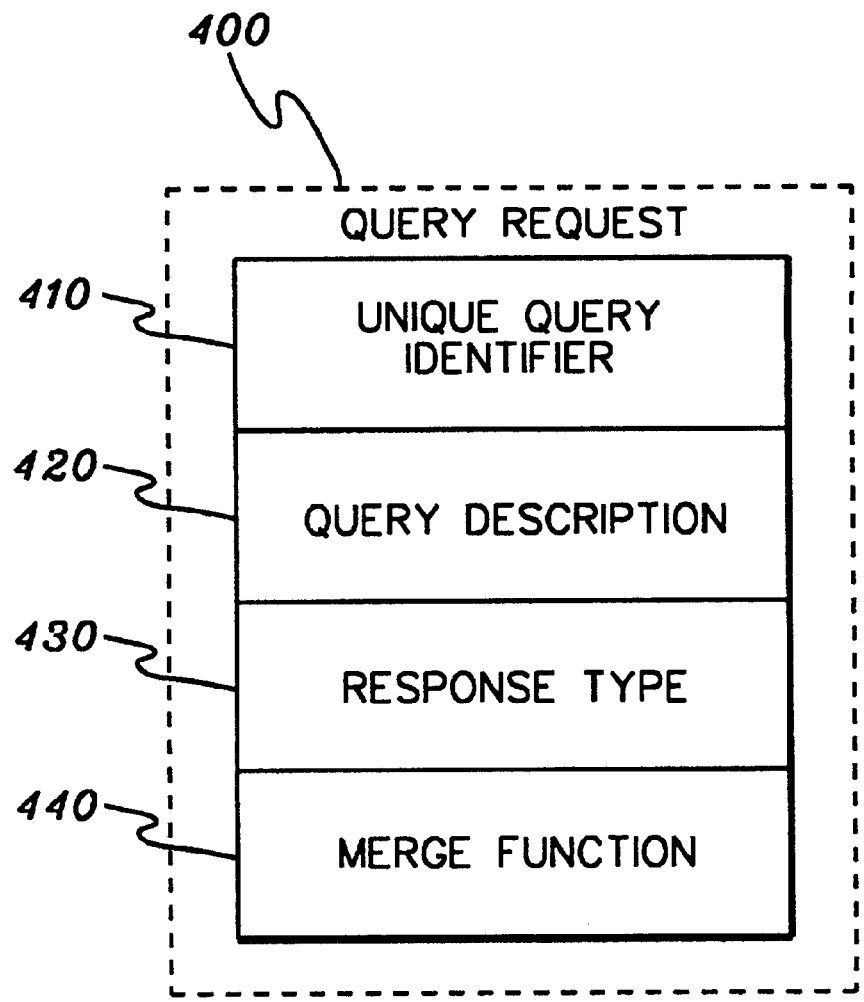
FIG. 4a illustrates one embodiment of a query request structure in accordance with the principles of the present invention.
Figure 4B:
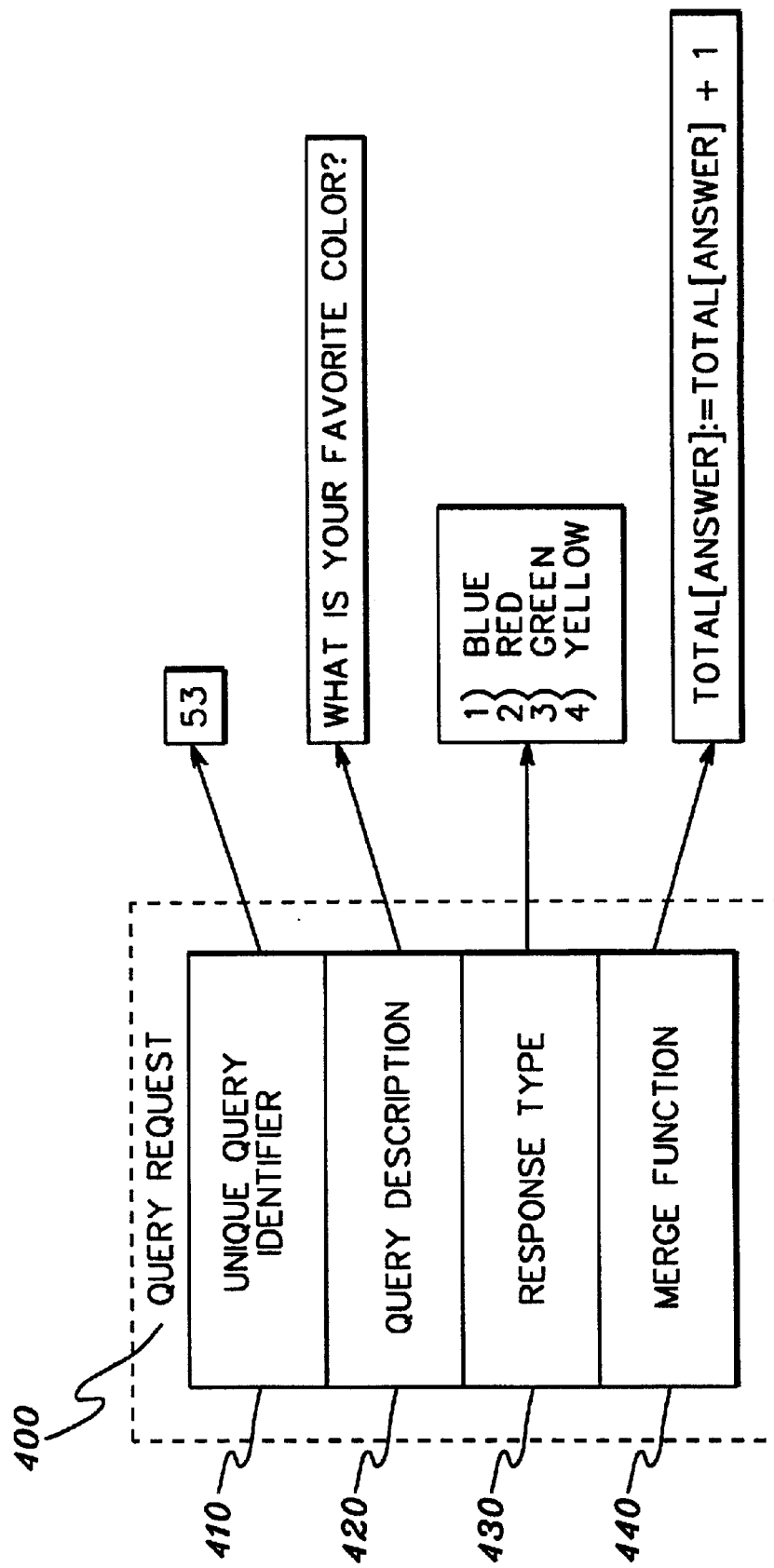

FIG. 4 depicts one embodiment of a query request 400 in accordance with the present invention. This query request includes a unique query identifier 410, a query description or message 420, a response type 430 and a merge function 440. The query description 420 is application specific and may include general text. For example, reference FIG. 4b wherein the query description 420 is "what is your favorite color?" As a further example, the query description could comprise a set of multiple choice questions, or even a description of a sequence of interactive graphics. The response type 430 is dependent on both the application and the nature of the query and may be general text, pictures, or multiple choice selections, as shown in FIG. 4b. It is also possible for either the query or the response type to be supplied as downloadable code (e.g., Java) or as an index into a preloaded code database. Unique query identifier 410 is provided herein to facilitate recovery should failure at a node occur as described further below.

The merge function 440 provides a mechanism for multiple responses to be collected into a single response or concatenated into a single response. The merge function may be customized for individual applications. Customization may be achieved either by referencing one of several well-known merge functions or by downloading a customized merge function into each interior node as part of the merge request within the query request. The exact format for providing merge functions is hidden through the use of the merge interpreter 320 (FIG. 3). Examples of possible merge functions include concatenation, answer counting and sample selection. A concatenation merge function collects a set of responses and collects them into a single list of responses. It is likely that a concatenation merge would exploit a compression algorithm to reduce the size of the response. Answer counting merge may be used with queries with a multiple-choice response type, e.g., see response type 430 of FIG. 4b. The results of each response are counted and the merged result is a tabulation of the number of selections of each option. Sample selection involves the choice of a subset of the responses to arrive at a new response. Selections may be chosen randomly (e.g., opinion polls) or may be based on parameters such as keywords and time. For example, a sample selection merge function could be used to return the first response with a correct answer.

Upon receiving a query request each leaf node or client 380 responds to its parent node using the gather protocol 300 of FIG. 3. Requests are received and responses are returned through a client interface 335. Each interior node in the tree collects the responses in this way and uses the application specific merge function ascertained by merge interpreter and supplied with the request, to merge its response with those of its children. Merging of responses is facilitated using a response log 350. Each interior node then passes the merged response to its parent node once all responses have been collected from children nodes. When the root merges its result with the results of its children nodes, a single response is returned to the server requesting the query.

Figure 5:
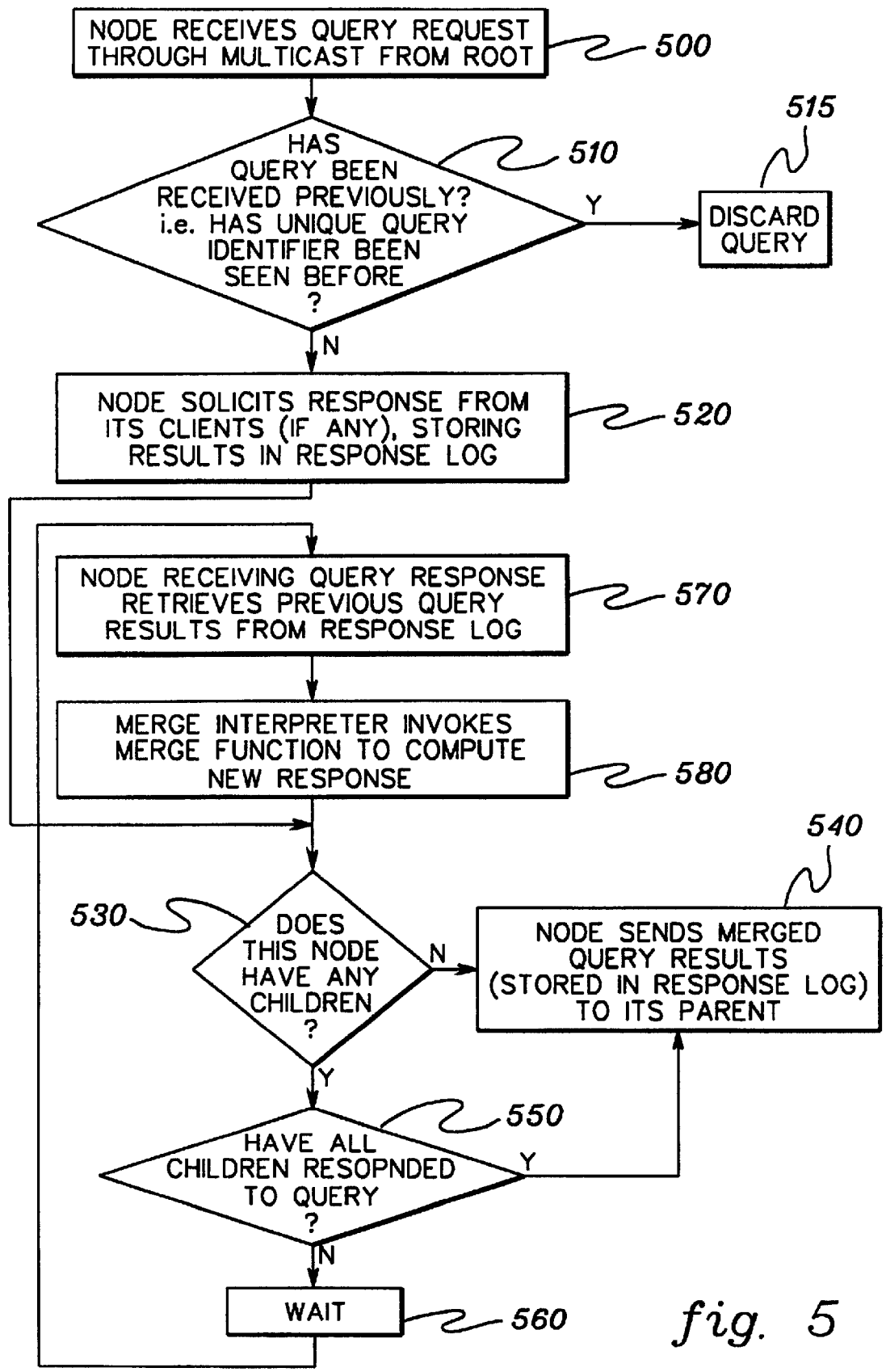
FIG. 5 is a flowchart of one embodiment of a response gathering process in accordance with the principles of the present invention.

FIG. 5 presents one embodiment of gather processing in accordance with the principles of the present invention. Each node receives the query request through a multicasting thereof from a root node 500. The node then determines whether the query has been received previously; that is, whether the unique query identifier associated with the query has been seen before 510, and if "yes", the query is discarded 515. As one example, this may occur during a network recovery operation described below. Assuming that the query request has not been seen before, then the node solicits a response from its clients, if any, and stores the results in a response log 520.

Next, the gather protocol determines whether this node has any children 530, and if "no", processing sends the merged query results stored in the response log from the node to its parent node 540. If the node does have children nodes, then a determination is made whether all the children nodes have responded to the query request 550, and again, if "yes", the node sends its merged query results stored in the response log to its parent node. Otherwise, the gather protocol waits for further responses from its children nodes 560. Upon receipt of a response, the receiving node retrieves previous query results from its response log 570 and the merge interpreter invokes the merge function to compute a new response 580 and store this new response in the response log 570. Thereafter, processing determines whether the node has any children nodes 530 and continues as described above.

In a further aspect of the present invention, reliability is ensured by building the gather protocol on top of more basic protocols. In particular, an assumption is made that reliable multicast is employed along with a heartbeat mechanism on the links between the parent node and its children nodes and from children nodes to parent nodes. To heartbeat a child, a parent periodically sends a Heartbeat Request Message to each child. Upon receipt of a Heartbeat Response Message, a child responds immediately with a Heartbeat Response Message. When a parent does not receive a Heartbeat Response Message from a child within some predetermined amount of time (based on parameters such as network latency or expected node load), the child is assumed to have failed. A standard approach to implementing heartbeats using "watchdog timers" may be found in "Probabilistic Failure Detection Using Watchdog Timers" by Tony P. Ng, University of Illinois at Urbana-Champaign, Department of Computer Science Technical Report number UIUCDCS-R-90-1521, published March 1990. By using such a heartbeat mechanism, a node failure can be detected and messages are not dropped, i.e., except for the case of the failed node. One skilled in the art will realize that there are multiple failure detection protocols upon which a reliable gather mechanism may be built.

In one embodiment, parents are required to detect the failure of their children nodes in the spanning tree. Upon detection of the failure of a child node, a parent node eliminates the child from its list of expected responses if the child is a leaf node in the tree. When the child is an internal node in the tree, the parent adopts the failed child node's children nodes and resends the query to these children nodes. In the future, the parent node will also monitor for failure at these new children nodes. Thus, even if a large number of nodes fail, eventually the tree will contain only alive nodes.

As noted above, each query request is labeled with a unique identifier by the sender. Upon receipt of a query in the reliable gather protocol, the node first ensures that it has yet to receive this query, thus eliminating repeated runs of the same query as a result of node failure. Periodically, a "garbage" collection message will be sent that allows nodes to eliminate all record of recorded query identifiers. In one embodiment, this garbage collection number is sent by the sender as a multicast. In another embodiment, each parent node periodically sends these messages to its children at some point after it receives permission from its parent node to garbage collect the query identifiers.

Figure 6:
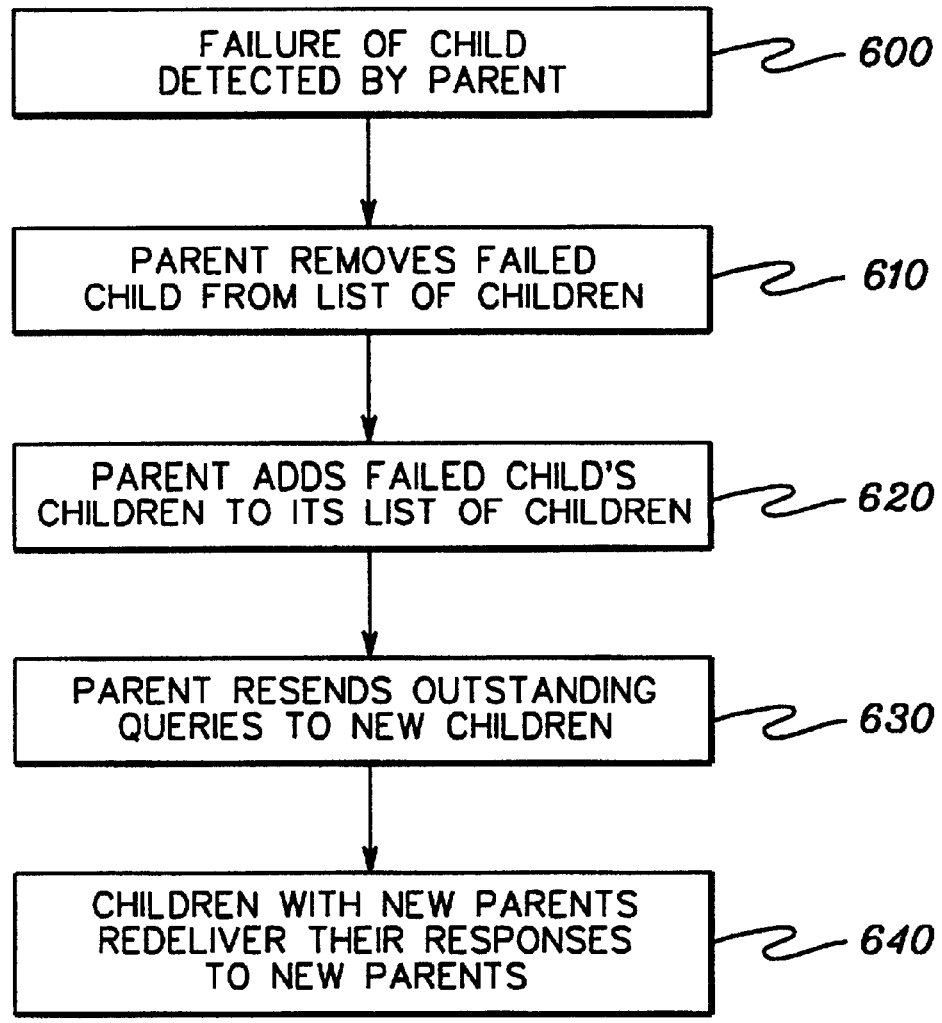
FIG. 6 is a flowchart of one embodiment of a response gathering process in the face of failure at a node of the distributed network environment, and in accordance with the principles of the present invention.

FIG. 6 depicts one embodiment of failure processing in accordance with the principles of the present invention. Upon detection by a parent node of failure at a child node 600, the parent node removes the failed child node from its list of children nodes 610. The parent then adds the failed child's children nodes to its list of children nodes 620 and resends the outstanding query request to these new children nodes 630. The children nodes with new parent nodes then deliver or redeliver the responses to the new parents 640. Thus, using this protocol individual nodes may fail, but the gather operation will continue to operate.

As a further consideration, the gather protocol, i.e., the protocol used to collect responses, may be optimized in response to the characteristics of the query request. For example, an opinion poll may only require a sample of the total responses and therefore may be complete before all responses have been received. To enable such an optimization, the application specific merge function returns a boolean value which is true if the merged values include enough values for a response to be generated.

Other optimizations may exploit idempotency of a query. The idempotent query is one where the same response received multiple times does not affect the result of the query. For example, in a distributed auction, the highest bid value is the goal of the query and receiving the same priced bid multiple times from the same bidder does not affect the outcome.

Each query encodes an idempotency flag which may be tested by the reliable gather protocol to eliminate the need for duplicate query detection. Furthermore, in an alternate embodiment, the reliable multicast protocol may test this flag to avoid the need for exactly once delivery semantics (i.e., a multicast mechanism that guarantees that each recipient will receive each message exactly once: no duplicate messages will be delivered and no messages will be dropped). Instead, a less expensive reliable multicast protocol may be used which provides at least once delivery semantics (i.e., a multicast mechanism that guarantees each recipient will receive each message, although some recipients may receive the message more than once).

The present invention can be used on one or more existing platforms. For example, active networks allow the downloading of custom code to do specific behavior desired in the network. These active networks could be used as the platform upon which the present invention could be implemented. See, for example, D. Scott Alexander et al., "The SwitchWare Active Network Architecture," IEEE Network Special Issue on Active and Controllable Networks, July 1998, Vol. 12, No. 3, pp. 29–36; R. Sharma, S. Keshav, M Wu, and L. Wu, "Environments for Active Networks," Proceedings of the IEEE 7th International Workshop on Network and Operating System Support for Digital Audio and Visual, 1997, pp. 77–84; and D. Tennenhouse, J. Smith, W. D. Sincoskie, D. Wetherall, G. Minden, "A Survey of Active Network Research" IEEE Communications Magazine, January, 1997, Vol. 35, No. 1, pp. 80–86.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as part of a computer system or sold separately.

Additionally, at least one program storage device readable by a machine tangibly embodying at least one program of instructions executable by the machine to perform the capabilities of the invention can be provided.

The flow diagrams depicted herein are provided by way of example only. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for retrieving information in a distributed network environment comprising:

distributing a query request and merge function code across the distributed network environment from a root node to multiple clients:

generating a merged response within said distributed network environment, said generating comprising producing said merged response in an application specific manner dependent on said merge function code distributed with said query request; and receiving back at the root node, from across the distributed network environment, said merged response produced from responses of at least some clients of said multiple clients; and wherein said distributed network environment comprises a plurality of nodes, and wherein said method comprises at a given node of said plurality of nodes:

gathering responses from at least one client or child node of said given node and merging gathered responses at said given node using the merge function code for forwarding of the merged response to a parent node of said given node.

2. The method of claim 1, wherein said distributed network comprises a spanning tree having said plurality of nodes, and wherein said method further comprises repeating said gathering and said merging at each node of said spanning tree having at least one client or child node so that a sender of the query request across the spanning tree receives a single merged response back.

3. The method of claim 1, further comprising multicasting the query request across the distributed network, said gathering of said response being responsive to said query request.

4. The method of claim 1, further comprising automatically adapting said merging based upon content of the query request and merge function code sent by a sender across the distributed network to multiple clients, wherein said merging is application specific to said query request.

5. The method of claim 1, wherein said merging comprises allowing said given node to reply to the query request from a parent node before all responses have been received by said given node from clients or child nodes thereof.

6. The method of claim 1, wherein said merge function code comprises one of a concatenation function, an answer counting function, or a sample selection function.

7. The method of claim 1, further comprising proceeding with said merging of gathered responses at said given node notwithstanding failure at one or more of said at least one client or child node of said given node.

8. A method for retrieving information in a distributed network environment comprising:

distributing a query request and merge function code across the distributed network environment from a root node to multiple clients:

generating a merged response within said distributed network environment, said generating comprising producing said merged response in an application specific manner dependent on said merge function code distributed with said query request; and receiving back at the root node, from across the distributed network environment, said merged response produced from responses of at least some clients of said multiple clients;

further comprising generating said merged response within said distributed network environment at other than said at least some clients responding to said query request.

9. A method for retrieving information in a distributed network environment comprising:

distributing a query request and merge function code across the distributed network environment from a root node to multiple clients;

generating a merged response within said distributed network environment, said generating comprising producing said merged response in an application specific manner dependent on said merge function code distributed with said query request; and receiving back at the root node, from across the distributed network environment, said merged response produced from responses of at least some clients of said multiple clients; and wherein said distributed network environment comprises a plurality of nodes, and wherein said method comprises implementing at multiple nodes of said plurality of nodes merging of responses to said query request in accordance with the application specific merge function code accompanying the query request.

10. The method of claim 9, wherein said distributed network environment comprises a spanning tree and said distributing comprises multicasting said query request and merge function code across said spanning tree, and said merging comprises merging responses of clients coupled to said spanning tree at multiple nodes of said spanning tree before returning to a root node of said spanning tree initiating said query request.

11. A system for retrieving information in a distributed network environment comprising:

means for distributing a query request and merge function code across the distributed network environment from a root node to multiple clients of the network environment;

means for generating a merged response within said distributed network environment, said means for generating comprising means for producing said merged response in an application specific manner dependent on said merge function code distributed with said query request; and means for receiving back at the root node, from across the distributed network environment, said merged response produced from responses of at least some clients of said multiple clients;

wherein said distributed network environment comprises a plurality of nodes, and wherein said system comprises:

means for gathering responses from at least one client or child node of said given node of said distributed network environment; and means for merging gathered responses at said given node using the merge function code for forwarding of the merged response to a parent node of said given node.

12. The system of claim 11, wherein said distributed network comprises a spanning tree having said plurality of nodes, and wherein said system further comprises means for implementing said means for gathering and said means for merging at each node of said spanning tree having at least one client or child node so that a sender of the query request across a spanning tree receives a single merged response back.

13. The system of claim 11, further comprising means for multicasting the query request across the distributed network, and wherein said means for gathering said responses is responsive to said query request.

14. The system of claim 11, further comprising means for automatically adapting said means for merging based upon content of the query request and merge function code sent by a sender across the distributed network to multiple clients, wherein said merging is application specific to said query request.

15. The system of claim 11, wherein said means for merging comprises means for allowing said given node reply to said query request from a parent node before all responses have been received by said given node from clients or child nodes thereof.

16. The system of claim 11, wherein said merge function code comprises one of a concatenation function, an answer counting function, or a sample selection function.

17. The system of claim 11, further comprising means for proceeding with said merging of gathered responses at said given node notwithstanding failure at one or more of said plurality of nodes in said distributed network environment.

18. A system for retrieving information in a distributed network environment comprising:

means for distributing a query request and merge function code across the distributed network environment from a root node to multiple clients of the network environment;

means for generating a merged response within said distributed network environment, said means for generating comprising means for producing said merged response in an application specific manner dependent on said merge function code distributed with said query request; and means for receiving back at the root node, from across the distributed network environment, said merged response produced from responses of at least some clients of said multiple clients;

further comprising means for generating said merged response within said distributed network environment at other than said at least some clients responding to said query request.

19. A system for retrieving information in a distributed network environment comprising:

means for distributing a query request and merge function code across the distributed network environment from a root node to multiple clients of the network environment;

means for generating a merged response within said distributed network environment, said means for generating comprising means for producing said merged response in an application specific manner dependent on said merge function code distributed with said query request; and means for receiving back at the root node, from across the distributed network environment, said merged response produced from responses of at least some clients of said multiple clients;

wherein said distributed network environment comprises a plurality of nodes, and wherein said system comprises means for implementing at multiple nodes of said plurality of nodes merging of responses to said query request.

20. The system of claim 19, wherein said distributed network environment comprises a spanning tree and said means for distributing comprises means for multicasting said query request and merge function code across said spanning tree and said means for merging comprises means for merging responses of clients coupled to said spanning tree at multiple nodes of said spanning tree before returning to a root node of said spanning tree initiating said query request.

21. An article of manufacture comprising:

a computer program product comprising computer usable medium having computer readable program code means therein for use in retrieving information in a distributed network environment, said computer readable program means in said computer program product comprising;

computer readable program code means for causing a computer to effect distributing a query request having a merge function code across the distributed network environment from a root node to multiple clients;

computer readable program code means for causing a computer to effect generating a merged response within said distributed network environment, said generating comprising producing said merged response in an application specific manner dependent on said merge function code distributed with said query request; and computer readable program code means for causing a computer to effect receiving back at the root node, from across the distributed network environment, said merged response produced from responses of at least some clients of said multiple clients;

wherein:

the distributed network environment comprises a plurality of nodes, and said computer readable program means in said computer program product comprises at a given node of said plurality of nodes;

computer readable program code means for causing a computer to effect gathering responses, from at least one client or child node of said given node; and computer readable program code means for causing a computer to effect merging gathered responses at said given node using the merge function code for forwarding of the merged response to a parent node of said given node.

* * * * *

UNITED STATES PATENT AND TRADEMARK OFFICE
CERTIFICATE OF CORRECTION

PATENT NO. : 6,889,254 B1
DATED : May 3, 2005
INVENTOR(S) : Chandra et al.

It is certified that error appears in the above-identified patent and that said Letters Patent is hereby corrected as shown below:

Column 8,
Line 44, delete the word "said" and insert the word -- the --
Line 45, delete the word "wherein"

Column 10,
Line 9, delete the word "said" and insert the word -- the --
Line 10, delete the word "wherein"
Line 13, delete the word "said" and insert the word -- a --

Column 11,
Line 18, insert the word -- further -- after the word "system"

Signed and Sealed this

Second Day of August, 2005

JON W. DUDAS
*Director of the United States Patent and Trademark Office*